(12) United States Patent
Itamoto et al.

(10) Patent No.: US 8,859,946 B2
(45) Date of Patent: Oct. 14, 2014

(54) LIGHT DETECTING DEVICE INCLUDING A PEAKING CIRCUIT

(75) Inventors: Hiromitsu Itamoto, Tokyo (JP); Norio Okada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 283 days.

(21) Appl. No.: 13/434,925

(22) Filed: Mar. 30, 2012

(65) Prior Publication Data
US 2012/0298844 A1 Nov. 29, 2012

(30) Foreign Application Priority Data
May 27, 2011 (JP) ................... 2011-118767

(51) Int. Cl.
H03F 3/08 (2006.01)
H04B 10/69 (2013.01)

(52) U.S. Cl.
CPC ............ H04B 10/691 (2013.01); H04B 10/693 (2013.01)
USPC ..................................... 250/214 A

(58) Field of Classification Search
CPC ..................................... H04B 10/691–10/6933
USPC ....................................................... 250/214 A
See application file for complete search history.

(56) References Cited

U.S. PATENT DOCUMENTS

| | | | |
|---|---|---|---|
| 5,373,388 A * | 12/1994 | Betts | 398/202 |
| 5,963,110 A | 10/1999 | Ihara et al. | |
| 6,760,552 B1 * | 7/2004 | Tajima et al. | 398/210 |
| 2008/0179496 A1 * | 7/2008 | Sakura et al. | 250/214 A |

FOREIGN PATENT DOCUMENTS

| | | | |
|---|---|---|---|
| JP | 5-129864 A | 5/1993 | |
| JP | 7-283711 A | 10/1995 | |
| JP | 11-122066 A | 4/1999 | |
| JP | 2002-111392 A | 4/2002 | |

OTHER PUBLICATIONS

State Intellectual Property Office of the People's Republic of China; Office Action in Chinese Patent Application No. 201210165535.5, (Jun. 25, 2014).

* cited by examiner

*Primary Examiner* — Thanh Luu
(74) *Attorney, Agent, or Firm* — Leydig, Voit & Mayer, Ltd.

(57) ABSTRACT

An optical detecting device includes a light-detecting element for outputting an electrical signal, a pre-amplifier for amplifying the electrical signal, a signal line connected to an output of the pre-amplifier, and a resistor and a capacitor connected in series between the signal line and GND.

2 Claims, 7 Drawing Sheets

LIGHT DETECTING DEVICE INCLUDING A PEAKING CIRCUIT

BACKGROUND OF THE INVENTION

1. Field of the Invention

The present invention relates to an optical receiving device used for optical communication.

2. Background Art

In optical receiving devices, a light-receiving element that receives an optical signal outputs an electric signal and a pre-amplifier amplifies the electric signal (e.g., see Japanese Patent Laid-Open No. 7-283711). In general, light-receiving sensitivity and a gain, and a passband have a trade-off relationship, and therefore a technique whereby the pre-amplifier applies peaking to extend the passband is adopted.

SUMMARY OF THE INVENTION

When peaking is applied excessively due to mounting conditions and circuit design of a light-receiving element and a pre-amplifier, manufacturing variations of the pre-amplifier, inductor of a wire connecting the pre-amplifier and the light-receiving element or the like, conventional optical receiving devices have a problem that a frequency response characteristic deteriorates and a reception sensitivity characteristic deteriorates.

In view of the above-described problems, an object of the present invention is to provide an optical receiving device which can improve the reception sensitivity characteristic.

According to the present invention, an optical receiving device includes: a light-receiving element outputting an electric signal; a pre-amplifier amplifying the electric signal; a signal line connected to an output of the pre-amplifier; and a resistor and a capacitor which are connected in series between the signal line and a GND.

The present invention makes it possible to improve the reception sensitivity characteristic.

Other and further objects, features and advantages of the invention will appear more fully from the following description.

DETAILED DESCRIPTION OF THE PREFERRED EMBODIMENTS

Optical receiving devices according to the embodiments of the present invention will be described with reference to the drawings. The same components will be denoted by the same symbols, and the repeated description thereof may be omitted.

First Embodiment

Figure 1:
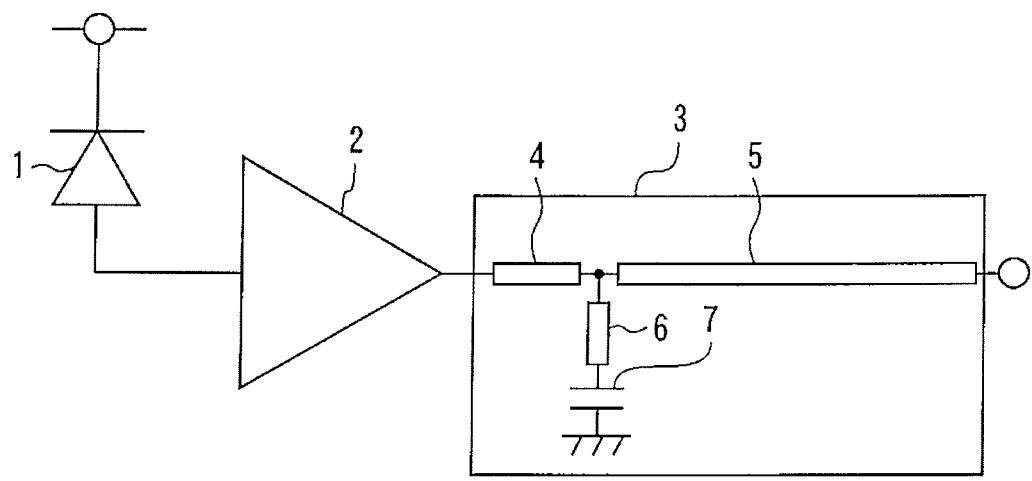
FIG. 1 is a diagram illustrating an optical receiving device according to a first embodiment of the present invention.

FIG. 1 is a diagram illustrating an optical receiving device according to a first embodiment of the present invention. A light-receiving element 1 that receives an optical signal outputs an electric signal and a pre-amplifier 2 amplifies the electric signal. Signal lines 4 and 5, a resistor 6 and a capacitor 7 are provided on an output substrate 3. Impedance matching is achieved between the signal lines 4 and 5 and these signal lines are connected to the output of the pre-amplifier 2. The resistor 6 and the capacitor 7 are connected in series between the signal lines 4 and 5 and a GND.

Figure 2:
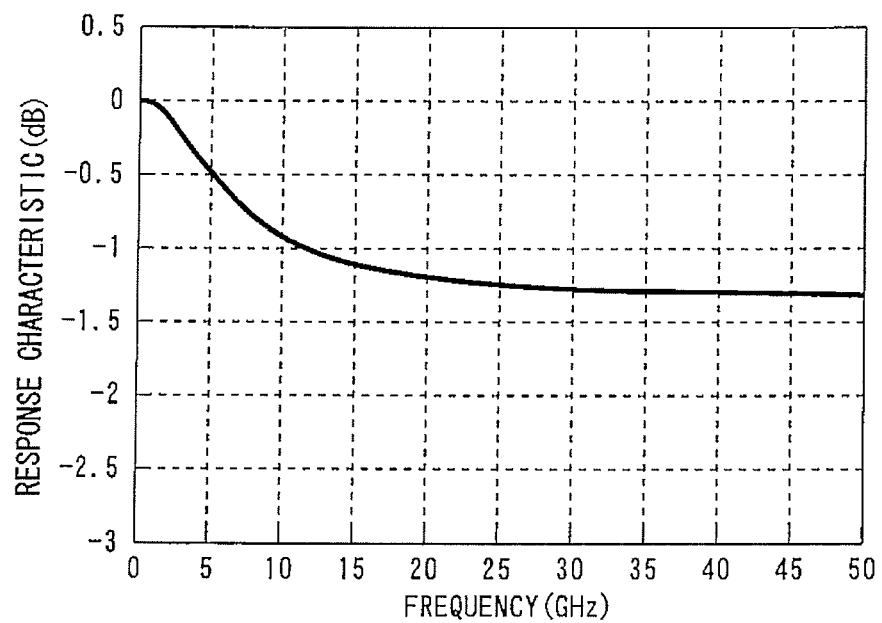
FIG. 2 is a diagram illustrating a frequency response characteristic of an output substrate according to the first embodiment of the present invention.

FIG. 2 is a diagram illustrating a frequency response characteristic of an output substrate according to the first embodiment of the present invention. The series circuit of the resistor 6 and the capacitor 7 has a high impedance when the frequency is low, and the impedance of the capacitor 7 decreases as the frequency increases, the impedance of the capacitor 7 can be ignored when the frequency is high and saturates at the resistance value of the resistor 6.

Figure 3:
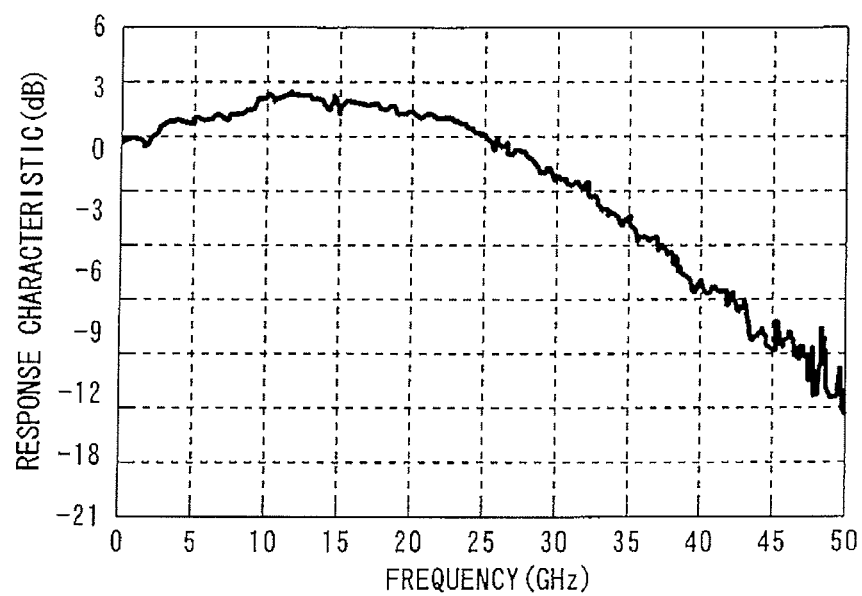
FIG. 3 is a diagram illustrating a frequency response characteristic of only the light-receiving element and the pre-amplifier.
Figure 4:
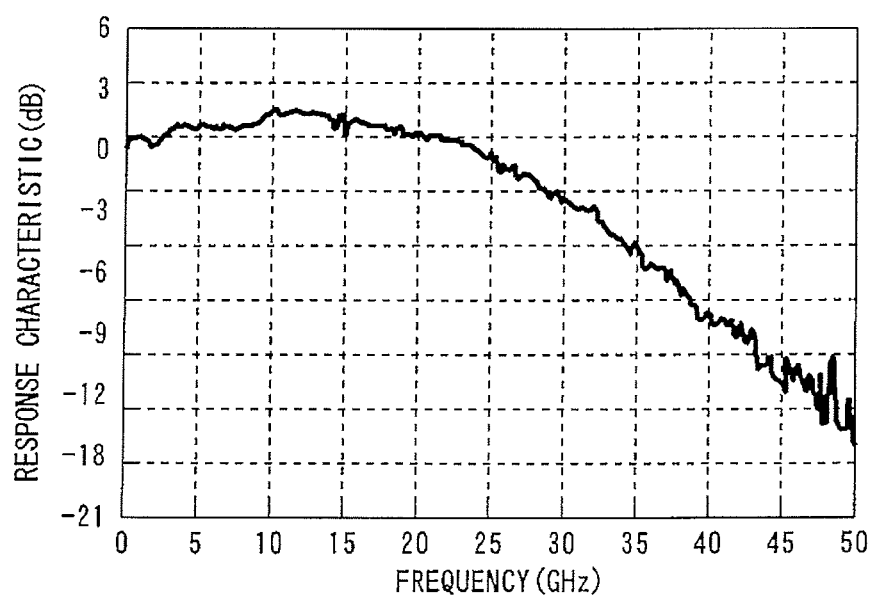
FIG. 4 is a diagram illustrating a frequency response characteristic of the optical receiving device according to the first embodiment of the present invention.

FIG. 3 is a diagram illustrating a frequency response characteristic of only the light-receiving element 1 and the pre-amplifier 2. FIG. 4 is a diagram illustrating a frequency response characteristic of the optical receiving device according to the first embodiment of the present invention. By combining the light-receiving element 1 demonstrating the frequency characteristic in FIG. 3 with the output substrate 3 demonstrating the frequency characteristic in FIG. 2, it is possible to obtain a frequency response characteristic with suppressed peaking. As a result, the reception sensitivity characteristic can be improved.

The resistor 6 and the capacitor 7 may be chip parts or may be configured with a wiring pattern on a ceramic substrate.

Second Embodiment

Figure 5:
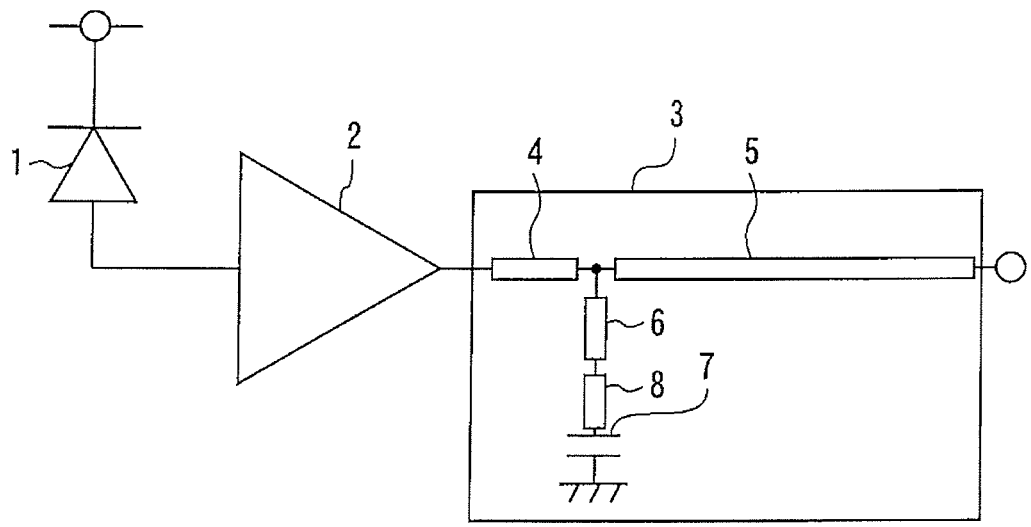
FIG. 5 is a diagram illustrating an optical receiving device according to a second embodiment of the present invention.

FIG. 5 is a diagram illustrating an optical receiving device according to a second embodiment of the present invention. An inductor 8 is added to the configuration of the first embodiment, which is connected in series to the resistor 6 and the capacitor 7 between the signal lines 4 and 5, and the GND.

When the frequency response characteristic of only the light-receiving element 1 and the pre-amplifier 2 is as shown in FIG. 3, it is preferable to reduce peaking from a low frequency to the order of 20 GHz, but if the gain also drops in a frequency band of 20 GHz or higher likewise, the band deteriorates. Thus, the present embodiment adds the inductor 8.

Figure 6:
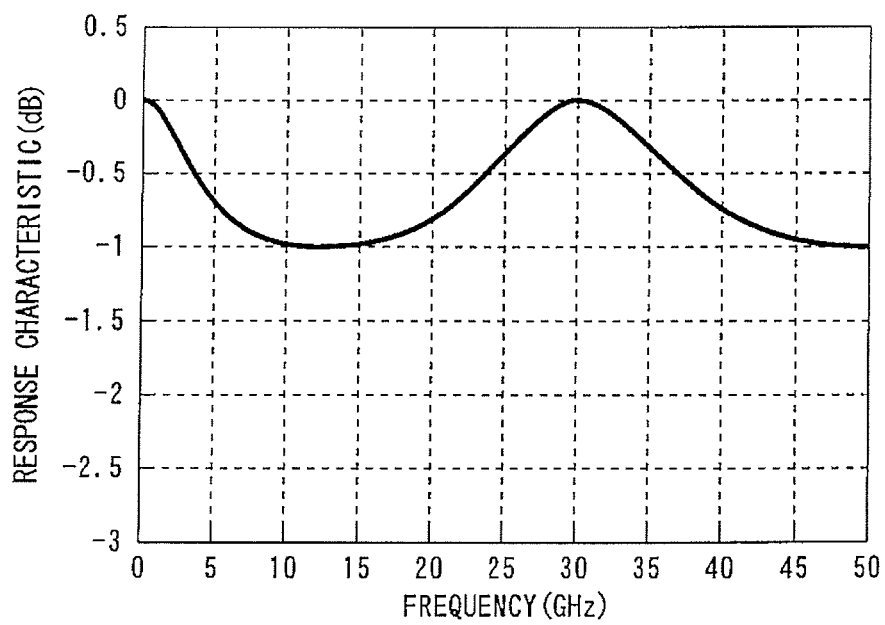
FIG. 6 is a diagram illustrating a frequency response characteristic of an output substrate according to the second embodiment of the present invention.

FIG. 6 is a diagram illustrating a frequency response characteristic of an output substrate 3 according to the second embodiment of the present invention. When the frequency increases, a joint impedance by the inductor 8 increases, and therefore the gain rises.

Figure 7:
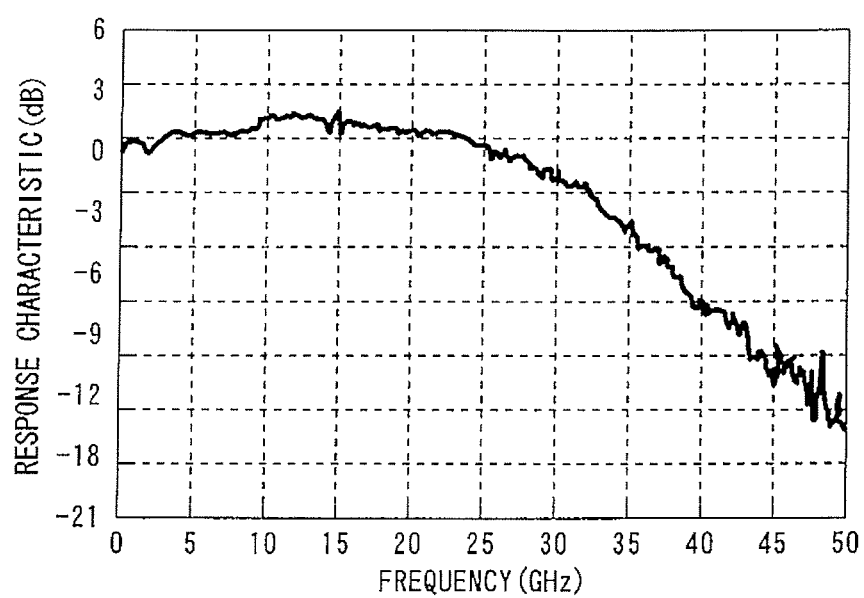
FIG. 7 is a diagram illustrating a frequency response characteristic of the optical receiving device according to the second embodiment of the present invention.

FIG. 7 is a diagram illustrating a frequency response characteristic of the optical receiving device according to the second embodiment of the present invention. By combining the light-receiving element 1 and the pre-amplifier 2 demonstrating the frequency response characteristic in FIG. 3 with the output substrate 3 demonstrating the frequency response characteristic in FIG. 6, it is possible to suppress peaking and also suppress band deterioration. Furthermore, the amount of peaking of the pre-amplifier 2 greatly varies from one product to another, but this individual variation can also be compensated by the output substrate 3.

The inductor 8 may be a chip part or may also be configured with a wiring pattern on a ceramic substrate.

Third Embodiment

Figure 8:
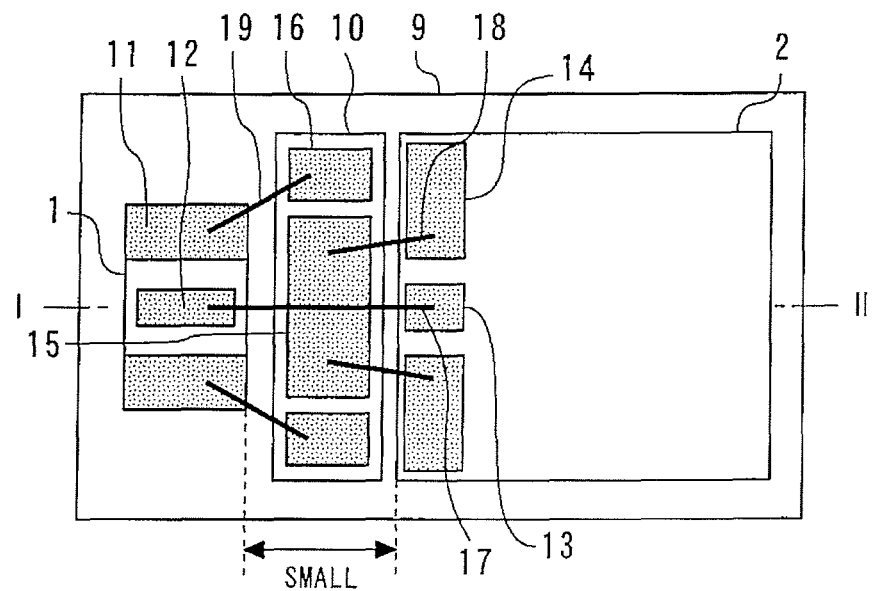
FIG. 8 is a top view illustrating an optical receiving device according to a third embodiment of the present invention.
Figure 9:
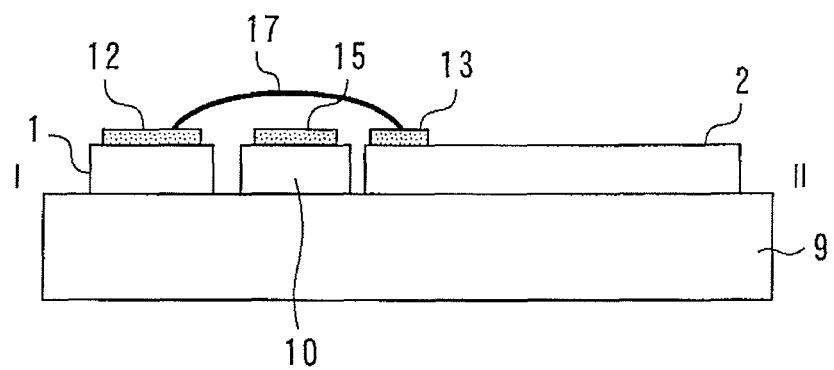
FIG. 9 is a cross-sectional view along I-II in FIG. 8.

FIG. 8 is a top view illustrating an optical receiving device according to a third embodiment of the present invention. FIG. 9 is a cross-sectional view along I-II in FIG. 8. A light-receiving element 1, a pre-amplifier 2 and an insulating substrate 10 are mounted on a conductive carrier 9. The insulating substrate 10 is arranged between the light-receiving element 1 and the pre-amplifier 2.

A GND electrode 11 and a signal electrode 12 making up a coplanar line are provided on a top surface of the light-receiving element 1. Mutually electric field coupled signal input pad 13 and GND pad 14 are provided on a top surface of the pre-amplifier 2. Electrodes 15 and 16 are provided on a top surface of the insulating substrate 10. The electrode 15, the carrier 9 and the insulating substrate 10 constitute a first capacitor. Similarly, the electrode 16, the carrier 9 and the insulating substrate 10 constitute a second capacitor.

The signal electrode 12 is connected to the signal input pad 13 via a wire 17. The GND pad 14 is connected to the electrode 15 via a wire 18. That is, the GND pad 14 is connected to the carrier 9 via the wire 18 and the first capacitor. The GND electrode 11 is connected to the electrode 16 via a wire 19. That is, the GND electrode 11 is connected to the carrier 9 via the wire 19 and the second capacitor.

Figure 10:
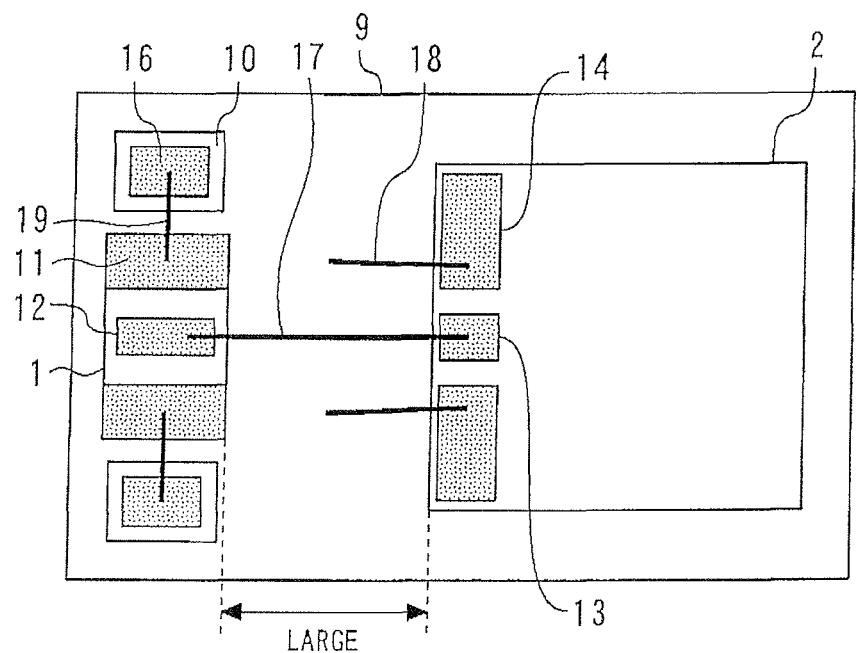
FIG. 10 is a top view illustrating an optical receiving device according to a comparative example.

Next, effects of the present embodiment will be described in comparison with a comparative example. FIG. 10 is a top view illustrating an optical receiving device according to a comparative example. In the comparative example, a GND pad 14 of a pre-amplifier 2 is connected to a carrier 9 via a wire 18 between a light-receiving element 1 and the pre-amplifier 2. In this case, to avoid interference between the wire mounting device and the light-receiving element 1 or the pre-amplifier 2, the distance between the light-receiving element 1 and the pre-amplifier 2 needs to be increased up to, for example, on the order of 700 μm. Therefore, since the wire 17 that connects the signal electrode 12 and the signal input pad 13 is extended, peaking occurs between the light-receiving element 1 and the pre-amplifier 2, and the characteristic deteriorates.

Furthermore, a voltage of, for example, 3.0 V needs to be applied to the GND electrode 11 of the light-receiving element 1. On the other hand, the voltage of the GND pad 14 of the pre-amplifier 2 is 0 V. Therefore, since there is a potential difference between the two, the two cannot be directly connected.

On the other hand, according to the present embodiment, the GND pad 14 of the pre-amplifier 2 is connected to the electrode 15 on the insulating substrate 10 via a wire. Since the GND pad 14 and the electrode 15 have substantially the same height, the wire mounting device never interferes with the light-receiving element 1 or the pre-amplifier 2. Therefore, since the distance between the light-receiving element 1 and the pre-amplifier 2 can be reduced, the reception sensitivity characteristic can be improved. Furthermore, there is a potential difference between the GND electrode 11 of the light-receiving element 1 and the GND pad 14 of the pre-amplifier 2, but the two can be connected together if the first capacitor is interposed therebetween.

The electrodes 15 and 16 together with the insulating substrate 10 and the carrier 9 constitute a capacitor, but without being limited to this, a capacitor may also be configured between the electrodes 15 and 16. Furthermore, the second capacitor is used as a bypass capacitor. The second capacitor may be individually provided beside the light-receiving element 1 as in the case of the comparative example, but providing the first capacitor and the second capacitor on one insulating substrate 10 can reduce the number of parts.

Fourth Embodiment

Figure 11:
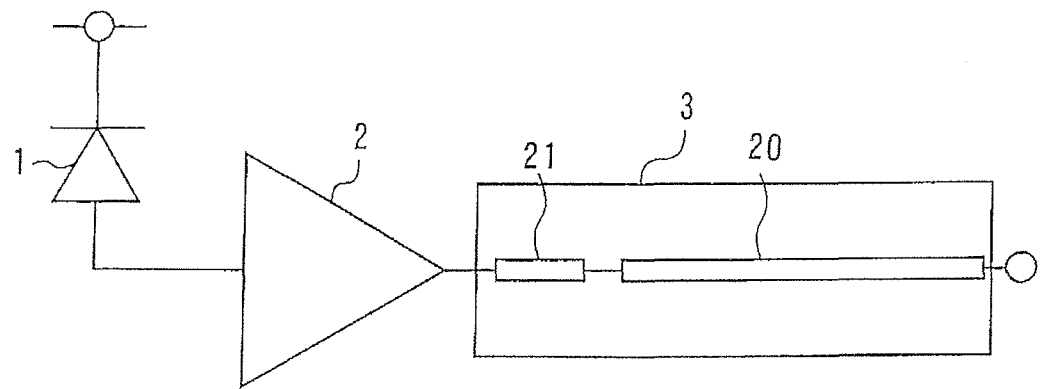
FIG. 11 is a top view illustrating an optical receiving device according to a fourth embodiment of the present invention.

FIG. 11 is a top view illustrating an optical receiving device according to a fourth embodiment of the present invention. An impedance-matched signal line 20 is connected to the output of a pre-amplifier 2. A signal line 21 is connected between the signal line 20 and the output of the pre-amplifier 2. This signal line 21 has a higher impedance than that of the signal line 20.

Figure 12:
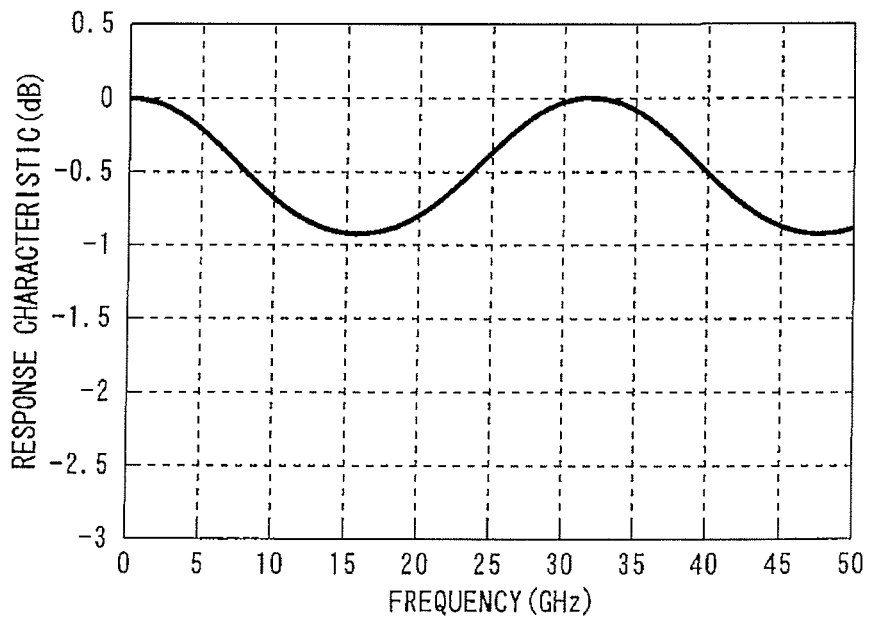
FIG. 12 is a frequency response characteristic of an output substrate according to the fourth embodiment of the present invention.

FIG. 12 is a frequency response characteristic of an output substrate 3 according to the fourth embodiment of the present invention. Adding the signal line 21 having a higher impedance than a matched impedance intentionally causes electrically multiplexed reflection to be generated. This produces a drop by a half cycle at 20 GHz and 1 dB in amplitude. The cycle and amplitude of multiplexed reflection are determined by the length of the signal line 21 and the amount of impedance deviation.

Figure 13:
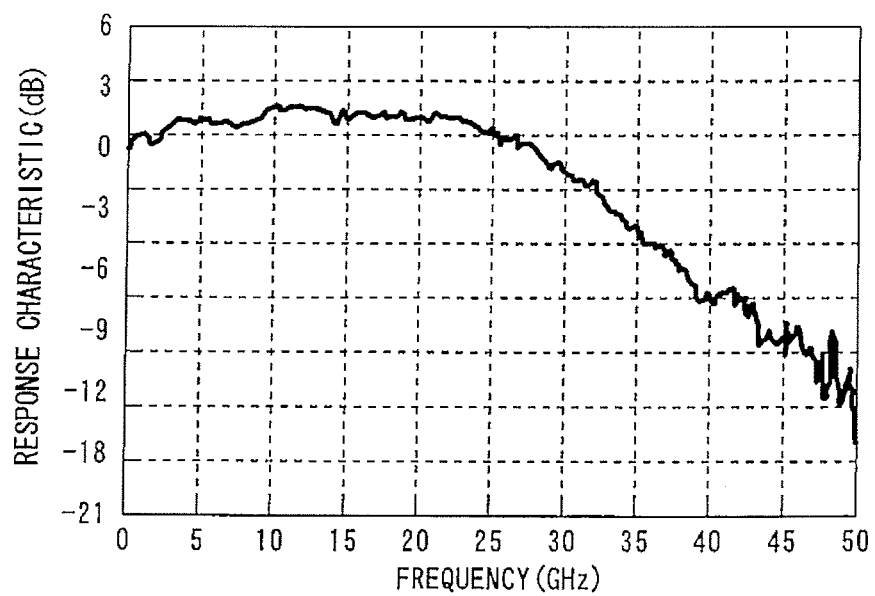
FIG. 13 is a diagram illustrating a frequency response characteristic of the optical receiving device according to the fourth embodiment of the present invention.

FIG. 13 is a diagram illustrating a frequency response characteristic of the optical receiving device according to the fourth embodiment of the present invention. By combining the light-receiving element 1 and the pre-amplifier 2 demonstrating the frequency characteristic in FIG. 3 with the output substrate 3 demonstrating the frequency response characteristic in FIG. 12, it is possible to improve the frequency response characteristic. As a result, the reception sensitivity characteristic can be improved.

Obviously many modifications and variations of the present invention are possible in the light of the above teachings. It is therefore to be understood that within the scope of the appended claims the invention may be practiced otherwise than as specifically described.

The entire disclosure of Japanese Patent Application No. 2011-118767, filed on May 27, 2011, including specification, claims, drawings, and summary, on which the Convention priority of the present application is based, is incorporated herein by reference in its entirety.

What is claimed is:

1. An optical detecting device comprising:
   a light-detecting element for outputting an electrical signal in response to incident light;
   a pre-amplifier for amplifying the electrical signal;
   an output substrate;
   first and second signal lines disposed on the output substrate, wherein
      the first and second signal lines are connected in series to each other at a junction,
      the first and second signal lines provide an impedance match, and
      the first signal line is connected to an output of the pre-amplifier and to the function of the first and second signal lines; and a resistor and a capacitor on the output substrate and connected in series to each other, wherein the resistor and capacitor are connected in series between the junction of the first and second signal lines and ground.

2. The optical detecting device according to claim 1, further comprising an inductor on the output substrate, wherein the inductor is connected in series with the resistor and the capacitor, between the junction of the first and second signal lines and the ground.

* * * * *